US011253847B2

(12) United States Patent
Álvarez Galván et al.

(10) Patent No.: US 11,253,847 B2
(45) Date of Patent: Feb. 22, 2022

(54) METHOD FOR PRODUCING CATALYSTS OF FORMULA MY(CE1-XLXO2-X/2)1-Y FOR THE USE THEREOF IN THE REVERSE WATER-GAS SHIFT REACTION AND PARTIAL OXIDATION OF METHANE INTO SYNTHESIS GAS BY MEANS OF THE METHOD OF COMBUSTION IN SOLUTION

(71) Applicants: CONSEJO SUPERIOR DE INVESTIGACIONES CIENTÍFICAS (CSIC), Madrid (ES); CONSEJO NACIONAL DE INVESTIGACIONES CIENTÍFICAS Y TÉCNICAS (CONICET), Buenos Aires (AR)

(72) Inventors: María Consuelo Álvarez Galván, Madrid (ES); Martín Dapena Ospina, Madrid (ES); José Antonio Alonso Alonso, Madrid (ES); Loreto Troncoso Aguilera, Madrid (ES); Vanesa Cascos Jiménez, Madrid (ES); José Miguel Campos Martín, Madrid (ES); José Luis García Fierro, Madrid (ES); Horacio Falcón Richeni, Buenos Aires (AR)

(73) Assignees: CONSEJO SUPERIOR DE INVESTIGACIONES CIENTIFICAS (CSIC), Madrid (ES); CONSEJO NATIONAL DE INVESTIGACIONES CIENTICAS Y TECNICAS (CONICET), Buenos Aires (AR)

( * ) Notice: Subject to any disclaimer, the term of this patent is extended or adjusted under 35 U.S.C. 154(b) by 5 days.

(21) Appl. No.: 16/474,706
(22) PCT Filed: Dec. 28, 2017
(86) PCT No.: PCT/ES2017/070863
§ 371 (c)(1),
(2) Date: Jun. 28, 2019
(87) PCT Pub. No.: WO2018/122439
PCT Pub. Date: Jul. 5, 2018

(65) Prior Publication Data
US 2020/0406246 A1 Dec. 31, 2020

(30) Foreign Application Priority Data

Dec. 29, 2016 (ES) .............................. ES201631709
Jun. 16, 2017 (ES) .............................. ES201730807

(51) Int. Cl.
*B01J 37/08* (2006.01)
*B01J 23/83* (2006.01)
(Continued)

(52) U.S. Cl.
CPC ............ *B01J 37/088* (2013.01); *B01J 23/83* (2013.01); *B01J 35/108* (2013.01); *C01B 3/40* (2013.01);
(Continued)

(58) Field of Classification Search
CPC ... B01J 23/38; B01J 23/63; B01J 23/83; B01J 35/108; B01J 37/08; B01J 37/088;
(Continued)

(56) References Cited

U.S. PATENT DOCUMENTS

2002/0193247 A1  12/2002  Krumpelt et al.

FOREIGN PATENT DOCUMENTS

GN  103183346 A  7/2013
GN  103418392 A  12/2013

OTHER PUBLICATIONS

Lidia Pino, "Hydrogen from Biogas: Catalytic Tri-Reforming Process with Ni/La—Ce—O Mixed Oxides", Journal, 2014, 91-105, vol. 148-149, Applied Catalysis B: Environmental.
(Continued)

*Primary Examiner* — Brian A McCaig
(74) *Attorney, Agent, or Firm* — Hayes Soloway P.C.

(57) ABSTRACT

The invention relates to a method for producing catalysts by the method of combustion in solution, to the catalysts produced by said method, and to the particular use thereof in the reverse water-gas shift reaction and in the partial
(Continued)

oxidation of the methane into synthesis gas. Therefore, it is understood that the present invention pertains to the area of the green industry aimed at the reduction of $CO_2$ on the planet.

21 Claims, 3 Drawing Sheets

(51) Int. Cl.
    *B01J 35/10* (2006.01)
    *C01B 3/40* (2006.01)

(52) U.S. Cl.
    CPC ............ *C01B 2203/0261* (2013.01); *C01B 2203/0283* (2013.01); *C01B 2203/1058* (2013.01); *C01B 2203/1241* (2013.01)

(58) Field of Classification Search
    CPC .. C01B 3/16; C01B 3/386; C01B 3/40; C01B 2203/0261; C01B 2203/0283; C01B 2203/1058; C01B 2203/1064; C01B 2203/107; C01B 2203/1241; Y02C 20/20; B01D 53/62
    See application file for complete search history.

(56) References Cited

OTHER PUBLICATIONS

Ankela H. Reddy, "A Rapid Microwave-Assisted Solution Combustion Synthesis of CuO Promoted CeO2-MxOy (M=Zr, La, Pr and Sm) Catalysts for CO Oxidation", Journal, 2012, 297-305, vol. 445-446, Applied Catalysis A: General.

Franck Morfin, "Synergy Between Hydrogen and Ceria in Pt-Catalysed CO Oxidation: An Investigation on Pt-CeO2 Catalysts Synthesized by Solution Combustion", Journal, 2016, 2-13, vol. 197, Applied Catalysis B: Environmental.

I.Z. Ismagilov, "Nanoscale Control During Synthesis of Me/La2O3, Me/CexGd1-xOy and Me/CexZr1-xOy (Me=Ni, Pt, Pd, Rh) Catalysts for Autothermal Reforming of Methane", Journal, 2013, 10-18, vol. 210, Catalysis Today.

Michele Aresta, "Catalysis for the Valorization of Exhaust Carbon: From CO2 to Chemicals, Materials, and Fuels. Technological Use of CO2", Journal, 2014, 1-34, 2014 Chemicals from Coal, Alkynes, and Biofuels.

Marc D. Porosoff, "Catalytic Reduction of CO2 by H2 for Synthesis of CO, Methanol and Hydrocarbons: Challenges and Opportunities", Journal, 2016, 62-73, vol. 9, Energy and Environmental Science, Royal Society of Chemistry.

Sung Su Kim, "A Study on the Effect of Support's Reducibility on the Reverse Water-Gas Shift Reaction Over Pt Catalysts", Journal, 2012, 100-107, vol. 423-424, Applied Catalysis A: General.

Sung Su Kim, "A Study of the Selectivity of the Reverse Water-Gas Shift Reaction Over Pt/TiO2 Catalysts", Journal, 2013, 47-54, vol. 108, Fuel Processing Technology.

Baowang Lu, "Direct Synthesis of Highly Loaded and Well-Dispersed NiO/SBA-15 for Producer Gas Conversion", Journal, 2012, 6800-6805, vol. 2, RSC Advances.

Luhui Wang, "Reverse Water Gas Shift Reaction Over Co-Precipitated Ni—CeO2 Catalysts", Journal, 2008, 66-70, vol. 26, Journal of Rare Earths.

Luhui Wang, "K-Promoted Co—CeO2 Catalyst for the Reverse Water-Gas-Shift Reaction", Journal, 2013, 682-682, vol. 42, Chemistry Letters.

Wei Wang, "Recent Advances in Catalytic Hydrogenation of Carbon Dioxide", Journal, 2011, 3703-3727, vol. 40, Chemical Society Reviews, Royal Society of Chemistry.

Luhui Wang, "Influence of Preparation Method on Performance of Ni—CeO2 Catalysts for Reverse Water-gas Shift Reaction", Journal, 2013, 559-564, vol. 31, No. 6, Journal of Rare Earths.

Bettina Rosch, "Electrochemical Characterization of Ni—Ce0.9Gd0.1O2-δfor SOFC Anodes", Journal, 2004, 113-117, vol. 175, Solid State Ionics.

T. Mimani, "Solution Combustion Synthesis of Nanoscale Oxides and their Composites", Journal, 2001, 134-137, vol. 4, Materials Physics and Mechanics.

Andrew P.E. York, "Brief Overview of the Partial Oxidation of Methane to Synthesis Gas", Journal, 2003, 345-358, vol. 22, Nos. 3-4, Topics in Catalysis.

Caludia Berger-Karin, "Mechanistic Origins of the Promoting Effect of Tiny Amounts of Rh on the Performance of NiOx/Al2O3 in Partial Oxidation of Methane", Journal, 2011, 116-124, vol. 280, Journal of Catalysis.

J. Barbero, "Support Effect in Supported Ni Catalysts on their Performance for Methane Partial Oxidation", Journal, 2003, 211-218, vol. 87, Nos. 3-4, Catalysis Letters.

Maria D. Salazar, "Hydrogen Production over Ni/Ceria-Supported Catalysts by Partial Oxidation of Methane", Journal, 2009, 9723-9729, vol. 34, International Journal of Hydrogen Energy.

Bjorn Christian Enger, "A Review of Catalytic Partial Oxidation of Methane to Synthesis Gas with Emphasis on Reaction Mechanisms over Transition Metal Catalysts", Journal, 2008, 1-27, vol. 346, Applied Catalysis A: General.

Yun Huang Hu, "Catalytic Conversion of Methane to Synthesis Gas by Partial Oxidation of CO2 Reforming", Journal, 2004, 297-345, vol. 48, Advances in Catalysis.

METHOD FOR PRODUCING CATALYSTS OF FORMULA MY(CE1-XLXO2-X/2)1-Y FOR THE USE THEREOF IN THE REVERSE WATER-GAS SHIFT REACTION AND PARTIAL OXIDATION OF METHANE INTO SYNTHESIS GAS BY MEANS OF THE METHOD OF COMBUSTION IN SOLUTION

CROSS-REFERENCE TO RELATED APPLICATIONS AND PRIORITY

This patent application claims priority from PCT Patent Application No. PCT/ES2017/070863 filed Dec. 18, 2017, which claims priority from Spanish Patent Application No.'s P201631709 filed Dec. 29, 2016 and P201730807 filed Jun. 16, 2017. Each of these patent applications are herein incorporated by reference in its/their entirety.

The invention relates to a method for obtaining catalysts by the method of combustion in solution, to the catalysts produced by said method, and to the particular use thereof in the reverse water-gas shift reaction and in the partial oxidation of the methane into synthesis gas.

Therefore, it is understood that the present invention pertains to the area of the green industry aimed at the reduction of $CO_2$ on the planet.

STATE OF THE ART

Carbon dioxide is the main source of greenhouse gases. To reduce its emissions, the progressive replacement of the use of fossil fuels for renewable energy sources becomes inescapable. The current use of $CO_2$ is limited to a few processes such as the synthesis of urea, salicylic acid and polycarbonates, but this only corresponds to a small percentage of the potential $CO_2$ useful to be transformed into chemicals and fuels. At present, many efforts are being made to consider it as a resource rather than as a residue, investing in the development of new technologies promoting its recycling.

One of the most promising processes for its recovery is the production of liquid and oxygenated hydrocarbons, which have an excellent volumetric energy density, from $CO_2$ (coming from thermal plants or from the combustion, pyrolysis or gasification of biomass waste, such as agricultural, forestry, livestock, urban waste, etc.) and from renewable $H_2$ (that could be generated by electrolysis, thermochemical cycles, biomass gasification, reforming of alcohols and polyols, etc.). The reduction of $CO_2$ with $H_2$ is an application that solves two problems: the recycling of the carbon and the storage of $H_2$. This is a two-stage process, in which the first and essential stage is the reverse water-gas shift reaction (Reverse Water-Gas Shift, RWGS, $CO_2+H_2 \leftrightarrows CO+H_2O$), which allows activating the stable molecule of carbon dioxide and transforming it into a more reactive compound, carbon monoxide. The second stage would consist of catalytic hydrogenation of $CO_2/CO$ mixtures to produce hydrocarbons, through the Fischer-Tropsch reaction, or methanol by hydrogenation of CO. Methanol is a basic compound for the production of a great variety of chemicals, such as dimethyl ether, substitute for diesel fuel and liquefied petroleum gases (LPG) [M. Aresta, A. Dibenedetto, A. Angelini, Chem. Rev. (2014) 114, 1709-1742] [M. D. Porosoff, B. Yan, J. G. Chen, Energy Environ. Sci. (2016) 9, 62-73].

The reverse water-gas shift reaction is slightly endothermic ($\Delta H°=41.2$ kJ/mol) and in equilibrium. This means that it benefits the use of high reaction temperatures, close to 700-800° C. At temperatures lower than 600° C., the thermodynamics would promote the methanation reaction of ($CO_2+3H_2 \leftrightarrows CH_4+H_2O$). To achieve higher conversions and enhanced kinetics, the use of a catalyst that is active and stable at these high temperatures is essential.

The RWGS reaction has been successfully investigated, using, among other active phases, noble metals [S. S. Kim, H. H. Lee, S. C. Hong, Appl. Catal., A (2012) 423-424, 100.] [S. S. Kim, K. H. Park, S. C. Hong, Fuel Process. Technol. [(2013) 108, 47], as well as nickel [B. Lu, K. Kawamoto, RSC Adv. (2012) 2, 6800. [L. Wang, S. Zhang, Y. [Liu, J. Rare Earths (2008) 26, 66.] and cobalt [L. Wang, H. Liu, Y. Chen, R. Zhang, S. Yang, Chem. Lett. (2013) 42, 682-683].

The support plays a critical role in the reaction, since the existence of oxygen vacancies promotes the adsorption of carbon dioxide. Thus, a requirement of the support is that it is reducible and has oxygen storage capacity. One of the reducible oxides used successfully in this reaction as constituent of the support is $CeO_2$ [12, 14, 17], A. Goguet, F. C. Meunier, D. Tibiletti, J. P. Breen, R. Burch, J. Phys. Chem. B. 108 (20240-20246) [L. Wang, H. Liu, Y. Chen, R. Zhang, S. Yang, Chem. Lett. (2013) 42, 682-683].

On the other hand, the most accepted reaction mechanism is based on the adsorption of $CO_2$ on an oxygen vacancy of the support, resulting in a carbonate with a support network oxygen, which will be then desorbed as carbon monoxide and leave the occupied oxygen vacancy. The hydrogen is dissociatively adsorbed on platinum and is diffused to a support oxygen, where it is recombined to form water vapour and creates an oxygen vacancy [W. Wang, S. Wang, X. Ma, J. Gong, Chem. Soc. Rev., 2011, Vol. 40, pages 3703-3727]. Taking into account that the most plausible reaction mechanism is bifunctional according to which both the transition metal and the oxide which is the support have a cooperative action, it is necessary to increase the metal-support interaction with a maximisation of the contact area between them. Therefore, the preparation method plays an important role in the synthesis of active and stable catalysts. Thus, the co-precipitation method, compared with the impregnation or precipitation-deposition method, results in better catalytic behaviour attributed to a greater contact between the active phase and oxygen vacancies that are in the support [L. Wang, H. Liu, Y. Liu, Y. Chen, S. Yang, J. Rare Earths 31 (2013) 559].

Thus, the patent CN103183346 discloses an invention relating to a method for synthesizing a catalyst, based on nickel and cerium, for the reverse water-gas shift reaction, wherein the activation of the catalyst is performed with pure $CO_2$ with high activity and stability, as well as low cost.

In the literature there are other compounds also based on a metal or a metal oxide deposited on Gd-doped ceria for other uses that are not catalysts, such as a compound of formula NiO—$Ce_{0.9}Gd_{0.1}O_{2-\delta}$ which is used as an anode in solid-state fuel cells and which is obtained by homogenisation of the ceria doped oxide with Gd and NiO in ball mill ["Electrochemical characterization of Ni—Ce0.9Gd0.1O2d for SOFC anodes" Bettina Rfscha, Hengyong Tua, Andreas O. Stfrmera, Axel C. Müller and Ulrich Stimming, Solid State Ionics 175 (2004) 113-117].

The patent CN103418392 (A) discloses the invention of a catalyst for reverse water-gas shift and preparation through the sol-gel method, using citric acid. The catalyst comprises cobalt as active phase and $CeO_2$ as support, as well as potassium as an auxiliary agent. It is indicated that the prepared catalyst has high activity, good selectivity and stability for the RWGS reaction.

However, these catalysts are of mass type, without internal porosity. This is a disadvantage since, in this type of systems, the dispersion of the active phases is low and it would be necessary to use a high amount of catalyst. For this reason, the synthesis of mesostructured oxides is a challenge, not only in the field of catalysis, but also in that of fuel cells and sensors. In order to increase the dispersion of the active phase, the combustion-based catalyst synthesis method is proposed as a very interesting route, since it would form a material with high porosity, so the required amount of catalyst would be significantly lower, thus having high heat resistance, an essential requirement given the high temperatures necessary to carry out the reaction.

This combustion synthesis is an exothermic redox reaction, in which oxidation and reduction reactions are produced simultaneously, between an oxidant and a fuel. Only when the oxidant and the fuel are intimately mixed in a fixed proportion, can the combustion initiate. In several cases, the heat necessary to initiate the reaction is internally generated. In other cases, it must be provided by an external source. The method of combustion in solution (SCS solution combustion synthesis), developed by Patil et al. [Patil, K. C., Mimani, T. Solution combustion synthesis of nanoscale oxides and their composites. Mater. Phys. Mech. 4, 134-137 (2001)], is based on a reaction of self-sustained combustion (the released heat is greater than that required for the reaction and the reactions are produced at high temperatures) between a fuel and an oxidant. Typically, the oxidant consists of a metallic precursor of nitrate type and the fuel is glycine, urea, citric acid etc. In this type of synthesis by combustion in solution, reagents are dissolved in water to achieve a molecular homogenisation in the reaction medium. The solution of the reagents is preheated with an external heat source at moderate temperatures (~150-350° C.), causing the evaporation of the water; when a critical temperature is reached, the solution self-combusts and the temperature rises very quickly (up to 104° C./second) to values over 1000° C. Simultaneously, the reaction converts the precursor mixture into materials with the desired composition and with high porosity, small particle size and high degree of crystallinity.

The fall in oil reserves has increased interest in the use of natural gas as an energy resource (through the so-called "hydrogen economy") and as a source of chemical products. Obtaining synthesis gas (CO and hydrogen) by catalytic partial oxidation of methane (CPOM), a mild exothermic reaction, provides an economic incentive compared to the current industry route: reforming process with water vapour, a very endothermic process. In addition, CPOM produces an $H_2/CO$ ratio of 2, which is ideal to be used directly in the production of hydrocarbons by the Fischer-Tropsch synthesis, and is fundamental raw material in the synthesis of methanol in the chemical industry (A. P. E. York, T. Xiao, and M. L. H. Green. Topics in Catalysis Vol. 22, (2003) 345-358).

Supported nickel-metal-based catalysts are active for CPOM; however, they suffer from a higher deactivation through the formation of coke and sintering. If we compare its activity to that of the catalysts with a noble metal (Pt, Pd, Ir, Ru or Rh) as active phase it is observed that the latter show higher activity and stability; however, this type of catalysts are very expensive in comparison with those based on nickel, therefore limiting its use in industrial processes (C. Berger-Karin et al. J. Catal. 280 (2011), 116).

For this process to be implemented at the industrial level it is necessary to develop active, stable, and economic catalysts so that they reduce the deactivation phenomena. Previous studies indicate that a high dispersion of the active phase is essential in obtaining good catalytic behaviour since the formation of coke is promoted by large metal particles (J. Barber et al., Catal. Lett. 87 (2003), 211). On the other hand, the use of promoters based on oxides with high ionic mobility, such as $CeO_2$, or different lanthanides, would increase the reactivity and stability. (M. D. Salazar-Villapando et al. Int. J Hydrogen Energy, 34 (2009), 9723).

The oxygen mobility in these catalysts appears crucial to increase its reactivity in this process (B. C. Enger, R. Ldeng, A. Holmen, Applied Catalysis A: General 346 (2008) 1-27).

On the other hand, another challenge today is to reduce the formation of hot spots, which are the result of the combination of a high space velocity and an exothermic reaction, which would make control of the process on an industrial scale difficult (Y. H. Hu and E. Ruckenstein/Adv. Catal. 48 (2004) 297-345).

DESCRIPTION OF THE INVENTION

The present invention provides a method for obtaining a cerium oxide substituted with a lanthanide L (from La to Lu), yttrium and/or scandium, in the positions of the Ce. The introduction of $L^{3+}$ partially substituting $Ce^{4+}$ induces the generation of oxygen vacancies in the crystal network, which are essential for the fixing of different gas molecules, as described above. In addition, this invention also involves the deposition of nanoparticles of a precious or semi-precious metal selected from the groups 8, 9, 10 and 11 of the periodic table of the elements in metallic form on the surface of the cerium oxide, preferably the metal being selected from nickel, copper, and platinum, which represent active centres. These cermet type materials can be used as catalysts in various reactions.

This method of obtainment or synthesis by combustion in solution results in catalysts, which do not require an activation stage prior to the active phase, since the metal is obtained directly in metallic state.

In addition, the catalysts have a high activity by mass of catalyst for the reactions of reverse water-gas shift reaction and partial oxidation of methane into synthesis gas.

Furthermore, the synthesis method results in nanoparticulate materials with high macroporosity, which increases the dispersion of the active phase.

Finally, the method of obtainment of the present invention reduces the formation of hotspots, which would have an important bearing on improving the stability and control of the temperature at the industry level.

Therefore, in a first aspect, the present invention relates to a method for the obtainment of a compound of formula:

$$M_y(Ce_{1-x}L_xO_{2-x/2})_{1-y}$$

wherein M is a metal selected from Ni, Ru, Rh, Pd, Ir, Pt, Ag, Au, or Cu, wherein x=0.0-0.4 and y=0.001-0.6, preferably y=0.02-0.6, and wherein L is selected from a lanthanide, Y or Sc, characterised in that it comprises the following steps:

a) dissolving, in the minimum amount of water, stoichiometric amounts of
   Ce nitrate,
   water soluble salt of a metal selected from Ni, Ru, Rh, Pd, Ir, Pt, Ag, Au, or Cu,
   L, Y or Sc nitrates
   and adding to the solution of step (a) a fuel in a molar ratio of between 0.7 and 1.0 with respect to the total amount of nitrates, b) stirring at room temperature till complete dissolution of the solution obtained in step (a), and c) heating the solution obtained in step (b) at a temperature between 200° C. and 600° C.

The presence of nitrates in the aqueous solution of step (a) is essential for the combustion method to work; therefore, in the present method of the invention, Ce and L, Y or Sc aqueous nitrates are used.

Examples of water-soluble salts of a metal selected from Ni, Ru, Rh, Pd, Ir, Pt, Ag, Au, or Cu are nitrates, chlorides, sulphates and coordinating compounds.

As platinum precursors, nitrates as well as soluble salts of inorganic complexes (coordinating compounds) such as Tetraammineplatinum (II) Hydroxide Hydrate (($NH_3$)$_4$Pt (OH)$_2$.x$H_2$O) and Tetraammineplatinum (II) nitrate (Pt($NH_3$)$_4$($NO_3$)$_2$) can be used.

Therefore, in the method of the invention, nickel nitrate (II) Ni($NO_3$)$_2$ 6$H_2$O is preferably used as Ni water-soluble salt.

Preferably, in the method of the invention, copper nitrate (II) Cu($NO_3$)$_2$.6$H_2$O is used as Cu water-soluble salt.

Preferably, in the method of the invention, a salt selected from Tetraammineplatinum (II) Hydroxide Hydrate (($NH_3$)$_4$Pt(OH)$_2$.x$H_2$O) and Tetraammineplatinum (II) nitrate (Pt($NH_3$)$_4$($NO_3$)$_2$) is used as Pt water soluble salt.

In another preferred embodiment of the method of the present invention, the compound of formula $M_y(Ce_{1-x}L_xO_{2-x/2})_{1-y}$ obtained presents a value for x other than 0 and, therefore, there will always be positions of the Ce substituted by a lanthanide Y or Sc.

This lanthanide element L is preferably selected from the following elements: La, Pr, Nd, Sm, Eu, Gd, Tb, Dy, Ho, Er, Tm, Yb, and Lu. More preferably, the lanthanide is selected from Gd and La.

When in a preferred embodiment the lanthanide L is Gd, preferably x has a value of between 0.05 and 0.2

When in a preferred embodiment the lanthanide L is Gd, preferably y has a value of between 0.001 and 0.15, preferably of between 0.03 and 0.15.

When in a preferred embodiment the lanthanide L is La, preferably x has a value of between 0.05 and 0.2

When in a preferred embodiment the lanthanide L is La, preferably y has a value of between 0.001 and 0.15, preferably of between 0.03 and 0.15.

When in a preferred embodiment the lanthanide L is Sm, preferably x has a value of between 0.05 and 0.2

When in another preferred embodiment the lanthanide L is Sm, preferably y has a value of between 0.001 and 0.15.

In another preferred embodiment of the method of the present invention, the fuel used in step (a) is selected from glycine, urea, citric acid, and a combination thereof. More preferably, glycine is used as fuel in step (a) of the method of the invention.

In the present invention the term "fuel" is used to carry out the synthesis by combustion in solution, so that, on evaporating the water present in the solution, the ignition of the fuel occurs, reaching more than 1000° C. in the reaction medium despite applying only 300° C. to the reaction. This method causes the generation of high-purity products and with high macroporosity.

In a preferred embodiment of step (c) of the method of the present invention, means are used to prevent water present in the solution from evaporating completely.

In another preferred embodiment of the method of the present invention, step (c) is carried out at a temperature of between 200° C. and 500° C.

Another aspect of the present invention relates to a compound characterised by the formula $M_y(Ce_{1-x}L_xO_{2-x/2})_{1-y}$, characterised in that M is a metal selected from Ni, Ru, Rh, Pd, Ir, Pt, Ag, Au, or Cu, x=0.0-0.4 and y=0.001-0.6, preferably y=0.02-0.6 and L is selected from a lanthanide, Y or Sc.

In another preferred embodiment of the compound of the present invention the compound is characterised in that M is Ni and its formula is $Ni_y(Ce_{1-x}L_xO_{2-x/2})_{1-y}$ wherein x=0.0-0.4 and y=0.005-0.6, preferably y=0.02-0.6, and wherein L is selected from a lanthanide, Y or Sc.

In another preferred embodiment of the compound of the present invention the compound is characterised in that M is Cu and its formula is $Cu_y(Ce_{1-x}L_xO_{2-x/2})_{1-y}$ wherein x=0.0-0.4 and y=0.005-0.6, preferably y=0.02-0.6, and wherein L is selected from a lanthanide, Y or Sc.

In another preferred embodiment of the compound of the present invention the compound is characterised in that M is Pt and a compound of formula $Pt_y(Ce_{1-x}L_xO_{2-x/2})_{1-y}$ is obtained wherein x=0.0-0.4 and y=0.001-0.6, preferably y=0.02-0.6, and wherein L is selected from a lanthanide, Y or Sc.

Furthermore, the compound of the present invention is preferably characterised in that it has a porosity percent between 70% and 95% and a pore mean diameter between 0.5 µm and 5 µm. This porosity is a key factor in the catalytic behaviour because it results in a very large active surface area per catalyst mass unit, resulting in an increase in catalytic activity.

A preferred embodiment of the compound relates to a compound of formula $M_y(Ce_{1-x}L_xO_{2-x/2})_{1-y}$, where x is other than 0, i.e., in a compound there will always be Ce positions substituted by a lanthanide or by Y or by Sc.

In a preferred embodiment of the compound the lanthanide L is selected from La, Pr, Nd, Sm, Eu, Gd, Tb, Dy, Ho, Er, Tm, Yb, and Lu.

Preferably, the lanthanide element is Gd; more preferably x has a value of between 0.05 and 0.2; and y has a value of between 0.001 and 0.15, even more preferably y has a value of between 0.03 and 0.15.

In another preferred embodiment of the compound the lanthanide is La; more preferably x has a value of between 0.05 and 0.2; or y has a value of between 0.001 and 0.15, even more preferably y has a value of between 0.03 and 0.15.

Preferably, the lanthanide element is Sm; more preferably x has a value of between 0.05 and 0.2; or y has a value of between 0.001 and 0.15.

Preferably, the compound of the present invention has been obtained using the method described above.

When the compound has the formula $Ni_y(Ce_{1-x}L_xO_{2-x/2})_{1-y}$, wherein M is Ni, x=0.0-0.4 and y=0.005-0.6, preferably y=0.02-0.6, and wherein L is selected from a lanthanide, Y or Sc, then in step (a) of the method of the present invention nickel nitrate is used.

When the compound has the formula $Cu_y(Ce_{1-x}L_xO_{2-x/2})_{1-y}$, wherein M is Cu, x=0.0-0.4 and y=0.005-0.6, and wherein L is selected from a lanthanide, Y or Sc, then in step (a) of the method of the present invention copper nitrate is used.

When the compound has the formula $Pt_y(Ce_{1-x}L_xO_{2-x/2})_{1-y}$, wherein M is Pt, x=0.0-0.4 and y=0.001-0.6, and wherein L is selected from a lanthanide, Y or Sc, then in step (a) of the method of the present invention Tetraammineplatinum (II) Hydroxide Hydrate is used.

A third aspect of the invention relates to the use of the compound described above as a catalyst.

A preferred use of the compound relates to its use as a catalyst in the reverse water-gas shift reaction.

In the present invention, "reverse water-gas shift reaction" means the reaction using $CO_2$ as a reagent together with $H_2$, which yields CO and water in the presence of a catalyst.

Preferably, in the reverse water-gas shift reaction a compound of formula $M_y(Ce_{1-x}L_xO_{2-x/2})_{1-y}$ is used as described above characterised in that x is other than zero and the lanthanide is Gd or La.

Preferably, the compound of formula $Ni_{0.1}(Ce_{0.96}Gd_{0.04}O_{1.95})_{0.9}$ is used as a catalyst in the reverse water-gas shift reaction.

Preferably, the compound of formula $Ni_{0.1}(Ce_{0.9}Gd_{0.1}O_{1.9})_{0.9}$ is used as a catalyst in the reverse water-gas shift reaction.

Preferably, the compound of formula $Ni_{0.1}(Ce_{0.9}La_{0.1}O_{1.95})_{0.9}$ is used as a catalyst in the reverse water-gas shift reaction.

Another preferred use of the compound of the present invention described above relates to its use as a catalyst in the partial oxidation reaction of methane to synthesis gas.

In the present invention "partial oxidation reaction of methane to synthesis gas" means that reaction using $CH_4$ as reagent together with $O_2$, in a certain mole fraction ($CH_4/O_2=2$), in the presence of a catalyst and yields synthesis gas.

Preferably, in the partial oxidation reaction of methane to synthesis gas a compound of formula $M_y(Ce_{1-x}L_xO_{2-x/2})_{1-y}$ is used, as described above, characterised in that x is other than zero and the lanthanide is Gd or Sm.

Preferably, the compound of formula $Ni_{0.1}(Ce_{0.9}Gd_{0.1}O_{1.9})_{0.9}$ is used as a catalyst of the partial oxidation reaction of methane to synthesis gas.

The advantages of the use of the compounds of the present invention as a catalyst are those shown below, and proven in the experimental data described in the examples:
- A high activity by mass of catalyst in the reverse water-gas shift reaction and in the partial oxidation reaction of methane to synthesis gas,
- the conversion of $CO_2$ is between 50% and 60%, the highest values being close to the thermodynamic equilibrium of the reverse water-gas shift reaction for the reaction conditions specified;
- the conversion of $CH_4$ and yield to hydrogen obtained are, with certain catalysts, values close to the thermodynamic equilibrium of the partial oxidation reaction of methane to synthesis gas for the reaction conditions specified;
- easy to prepare,
- they do not need an activation stage in reducing atmosphere,
- nanostructured materials,
- high macroporosity,
- stable in the harsh conditions in which the reverse water-gas shift reaction is carried out
- the activity remains unchanged after 100 h-operating under continuous flow in the reverse water-gas shift reaction Throughout the description and the claims, the word "comprises" and its variations are not intended to exclude other technical features, additives, components or steps. For the persons skilled in the art, other objects, advantages and features of the invention will partly arise from the description and partly from the practice of the invention. The following examples and figures are provided as an illustration and are not intended to be limiting of the present invention.

EXAMPLES

The invention will be illustrated below by assays carried out by the inventors, which show the improvement in the synthesis conditions and catalytic activity.

Example 1

In a beaker, 1.051 grams glycine, 2.606 grams nitrate cerium (($Ce(NO_3)_3.6H_2O$), 0.229 grams gadolinium nitrate ($Gd(NO_3)_3.6H_2O$) are mixed. Then 25 mL of distilled water are added to dissolve the above-mentioned compounds. The beaker with the mixture of the above reagents is placed on a heating plate with another inverted larger beaker covering the former and with aluminium foil on its base. The temperature of the plate is then increased to 300 degrees Celsius and, after waiting a few minutes until the synthesis by combustion in solution occurs, a cerium and gadolinium mixed oxide is formed. This material is designated $Ce_{0.9}Gd_{0.1}O_{1.95}$.

Example 2

In a beaker, 1.044 grams glycine, 0.039 grams nickel nitrate ($Ni(NO_3)_2.6H_2O$), 2.553 grams cerium nitrate (Ce $(NO_3)_3.6H_2O$), 0.224 grams gadolinium nitrate ($Gd(NO_3)_3.6H_2O$) are mixed. Then 25 mL of distilled water is added to dissolve the above-mentioned compounds. The beaker with the mixture of the above reagents is placed on a heating plate with another inverted larger beaker covering the former and with aluminium foil on its base. The temperature of the plate is then increased to 300 degrees Celsius and, after waiting a few minutes until the synthesis by combustion in solution occurs, a cermet type material is formed with a microporous morphology and constituted by metallic nickel nanoparticles supported on a cerium and gadolinium mixed oxide. This material is designated $(Ni)_{0.02}(Ce_{0.9}Gd_{0.1}O_{1.95})_{0.98}$.

Example 3

Figure 1:
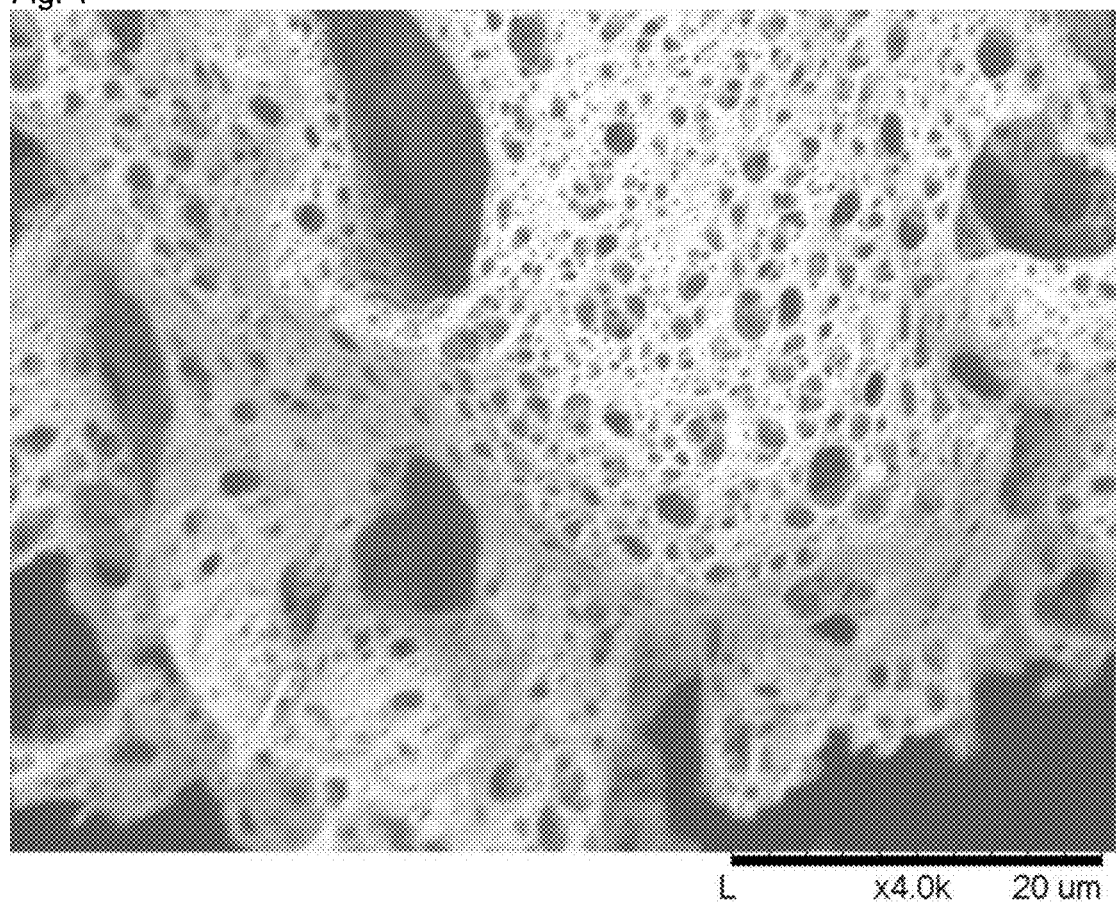
FIG. 1. SEM micrograph of the catalyst $Ni_{0.04}(Ce_{0.9}Gd_{0.1}O_{1.95})_{0.96}$ after synthesis by the method of combustion in solution FIG. 2. Represents the conversion percentage of $CO_2$ throughout the reaction time (reaction RWGS) for the catalyst $Ni_{0.04}(Ce_{0.9}Gd_{0.1}O_{1.95})_{0.96}$.

In a beaker, 1.037 grams glycine, 0.078 grams nickel nitrate ($Ni(NO_3)_2.6H_2O$), 2.501 grams cerium nitrate ($Ce(NO_3)_3.6H_2O$), 0.220 grams gadolinium nitrate ($Gd(NO_3)_3.6H_2O$) are mixed. Then 25 mL of distilled water are added to dissolve the above-mentioned compounds. The beaker with the mixture of the above reagents is placed on a heating plate with another inverted larger beaker covering the former and with aluminium foil on its base. The temperature of the plate is then increased to 300 degrees Celsius and, after waiting a few minutes until the synthesis by combustion in solution occurs, a cermet type material is formed with a microporous morphology and constituted by metallic nickel nanoparticles supported on a cerium and gadolinium mixed oxide. This material is designated $(Ni)_{0.04}(Ce_{0.9}Gd_{0.1}O_{1.95})_{0.96}$. Its SEM micrograph (obtained by Scanning Electron Microscopy) is shown, by way of example in FIG. 1.

Example 4

In a beaker, 1.016 grams glycine, 0.194 grams nickel nitrate $(Ni(NO_3)_2.6H_2O)$, 2.345 grams cerium nitrate $(Ce(NO_3)_3.6H_2O)$, 0.206 grams gadolinium nitrate $(Gd(NO_3)_3.6H_2O)$ are mixed. Then 25 mL of distilled water are added to dissolve the above-mentioned compounds. The beaker with the mixture of the above reagents is placed on a heating plate with another inverted larger beaker covering the former and with aluminium foil on its base. The temperature of the plate is then increased to 300 degrees Celsius and, after waiting a few minutes until the synthesis by combustion in solution occurs, a cermet type material is formed, constituted by metallic nickel nanoparticles supported on a cerium and gadolinium mixed oxide. This material is designated $(Ni)_{0.1}(Ce_{0.9}Gd_{0.1}O_{1.98})_{0.9}$.

Example 5

In a beaker, 1.016 grams glycine, 0.194 grams nickel nitrate $(Ni(NO_3)_2.6H_2O)$, 2.345 grams cerium nitrate $(Ce(NO_3)_3.6H_2O)$, 0.260 grams lanthanum nitrate $(Gd(NO_3)_3.6H_2O)$ are mixed. Then 25 mL of distilled water are added to dissolve the above-mentioned compounds. The beaker with the mixture of the above reagents is placed on a heating plate with another inverted larger beaker covering the former and with aluminium foil on its base. The temperature of the plate is then increased to 300 degrees Celsius and, after waiting a few minutes until the synthesis by combustion in solution occurs, a cermet type material is formed with a microporous morphology and constituted by metallic nickel nanoparticles supported on a cerium and lanthanum mixed oxide. This material is designated $(Ni)_{0.1}(Ce_{0.9}La_{0.1}O_{1.95})_{0.9}$.

Example 6

In a beaker, 1.0473 grams glycine, 0.0194 grams nickel nitrate $(Ni(NO_3)_2.6H_2O)$, 2.5793 grams cerium nitrate $(Ce(NO_3)_3.6H_2O)$, 0.2979 grams gadolinium nitrate $(Gd(NO_3)_3.6H_2O)$ are mixed. Then 25 mL of distilled water are added to dissolve the above-mentioned compounds. The beaker with the mixture of the above reagents is placed on a heating plate with another inverted larger beaker covering the former and with aluminium foil on its base. The temperature of the plate is then increased to 300 degrees Celsius and, after waiting a few minutes until the synthesis by combustion in solution occurs, a cermet type material is formed with a microporous morphology and constituted by metallic nickel nanoparticles supported on a cerium and gadolinium mixed oxide. This material is designated $(Ni)_{0.01}(Ce_{0.9}Gd_{0.1}O_{1.95})_{0.99}$.

Example 7

In a beaker, 1.5620 grams glycine, 0.0189 grams copper nitrate $(Cu(NO_3)_2.6H_2O)$, 3.869 grams cerium nitrate $(Ce(NO_3)_3.6H_2O)$, 0.4470 grams gadolinium nitrate $(Gd(NO_3)_3.6H_2O)$ are mixed. Then 37 mL of distilled water are added to dissolve the above-mentioned compounds. The beaker with the mixture of the above reagents is placed on a heating plate with another inverted larger beaker covering the former and with aluminium foil on its base. The temperature of the plate is then increased to 300 degrees Celsius and, after waiting a few minutes until the synthesis by combustion in solution occurs, a cermet type material is formed with a microporous morphology and constituted by metallic nickel nanoparticles supported on a cerium and gadolinium mixed oxide. This material is designated $(Cu)_{0.01}(Ce_{0.9}Gd_{0.1}O_{1.95})_{0.99}$.

Example 8

In a beaker, 1.5620 grams glycine, 0.0297 grams Tetraammineplatinum (II) Hydroxide Hydrate $((NH_3)_4Pt(OH)_2.xH_2O)$, 3.8690 grams cerium nitrate $(Ce(NO_3)_3.6H_2O)$, 0.4470 grams gadolinium nitrate $(Gd(NO_3)_3.6H_2O)$ are mixed.

Then 37 mL of distilled water are added to dissolve the above-mentioned compounds. The beaker with the mixture of the above reagents is placed on a heating plate with another inverted larger beaker covering the former and with aluminium foil on its base. The temperature of the plate is then increased to 300 degrees Celsius and, after waiting a few minutes until the synthesis by combustion in solution occurs, a cermet type material is formed with a microporous morphology and constituted by metallic nickel nanoparticles supported on a cerium and gadolinium mixed oxide. This material is designated $(Cu)_{0.01}(Ce_{0.9}Gd_{0.1}O_{1.95})_{0.99}$.

Example 9

The materials prepared according to the methodology described in Examples 1 to 5 have been tested as catalysts in the reverse water-gas shift reaction. These catalysts have been selected to find the limits of use with regard to the different compositions. The process has been conducted under the following reaction conditions: 300,000 mLN/h·g, 700° C., $H_2/CO_2=2$, 10% volume of $N_2$. The reaction temperature is increased from room temperature to that of the reaction in the reaction gas mixture itself.

According to the results obtained (Table 1), the conversion of $CO_2$ and catalytic stability vary according to the proportion of nickel. The catalyst without nickel is that which, after requiring a period of induction of about 3 hours, shows its activity towards a stable conversion increased by close to 26%. The other catalysts had, at the beginning of the reaction, a similar conversion between 55 and 59%, but experience a different behaviour throughout the reaction. Thus, the one with lower proportion of nickel $(Ni)_{0.02}(Ce_{0.9}Gd_{0.1}O_{1.95})_{0.98}$) is slightly deactivated after 6 hours reaction, reaching a conversion of about 53%, respectively. The other catalysts result in fairly stable conversions throughout the 6 hours reaction. According to the results obtained, a slightly higher conversion for a mole fraction between the nickel and the mixed oxide equal to 4:96 is observed. This catalyst experiences a slight increase in conversion after 6 hours reaction, and the obtained conversion is, for this reaction time, practically on the thermodynamic equilibrium (which is of 59.3% for these reaction conditions). Regarding the CO selectivity (Table 2) it is observed that its values are over 96% for all the catalysts tested, with $CH_4$ being the minority compound that is formed and which adjusts the carbon equilibrium.

The catalyst comprising metallic nickel supported on lanthanum-doped ceria $((Ni)_{0.1}(Ce_{0.9}La_{0.1}O_{1.95})_{0.9})$ shows high activity and stability, compared to its analogue doped with gadolinium $((Ni)_{0.1}(Ce_{0.9}La_{0.1}O_{1.95})_{0.9})$.

conditions: 300,000 mLN/h·g, 700° C., $H_2/CO_2=2$, 10% volume of $N_2$. The reaction temperature is increased from room temperature to that of the reaction in the reaction gas mixture itself.

TABLE 1

It shows the conversion percentage of the $CO_2$ throughout the reaction time (RWGS reaction) for various catalysts.

| $Ce_{0.9}Gd_{0.1}O_{1.95}$ | | $(Ni)_{0.02}(Ce_{0.9}Gd_{0.1}O_{1.95})_{0.96}$ | | $(Ni)_{0.04}(Ce_{0.9}Gd_{0.1}O_{1.95})_{0.98}$ | | $(Ni)_{0.1}(Ce_{0.9}Gd_{0.1}O_{1.95})_{0.9}$ | | $(Ni)_{0.1}(Ce_{0.9}La_{0.1}O_{1.95})_{0.9}$ | |
|---|---|---|---|---|---|---|---|---|---|
| t (h) | CO2 Conv (%) | t (h) | CO2 Conv (%) | t (h) | CO2 Conv (%) | t (h) | CO2 Conv (%) | t (h) | CO2 Conv (%) |
| 0 | 19.6 | 0 | 56.7 | 0 | 54.82 | 0 | 55.2 | 0 | 55.5 |
| 0.5 | 22.2 | 0.82 | 57.2 | 0.55 | 56.96 | 0.50 | 55.9 | 0.50 | 56.3 |
| 1.07 | 23.9 | 1.62 | 56.0 | 1.13 | 57.15 | 1.02 | 56.2 | 1.01 | 56.5 |
| 1.62 | 24.8 | 2.40 | 55.7 | 1.73 | 57.33 | 1.54 | 56.1 | 1.52 | 56.7 |
| 2.19 | 25.6 | 3.14 | 54.0 | 2.36 | 57.45 | 2.06 | 56.2 | 2.05 | 56.7 |
| 2.79 | 26.1 | 3.86 | 53.4 | 3.02 | 57.48 | 2.61 | 56.4 | 2.59 | 56.8 |
| 3.39 | 26.3 | 4.57 | 53.2 | 3.69 | 57.54 | 3.17 | 56.3 | 3.14 | 56.8 |
| 4.03 | 26.4 | 5.25 | 53.1 | 4.40 | 57.58 | 4.33 | 56.4 | 4.25 | 56.9 |
| 4.72 | 26.4 | 5.90 | 52.9 | 5.15 | 57.75 | 4.92 | 56.5 | 4.83 | 56.9 |
| 5.47 | 26.5 | | | 5.94 | 58.62 | 6.14 | 56.6 | 6.00 | 57.0 |

TABLE 2

It shows the selectivity percentage of the CO throughout the reaction time (RWGS reaction) for various catalysts.

| $Ce_{0.9}Gd_{0.1}O_{1.95}$ | | $(Ni)_{0.02}(Ce_{0.9}Gd_{0.1}O_{1.95})_{0.98}$ | | $(Ni)_{0.04}(Ce_{0.9}Gd_{0.1}O_{1.95})_{0.95}$ | | $(Ni)_{0.1}(Ce_{0.9}Gd_{0.1}O_{1.95})_{0.9}$ | | $(Ni)_{0.1}(Ce_{0.9}La_{0.1}O_{1.95})_{0.9}$ | |
|---|---|---|---|---|---|---|---|---|---|
| t (h) | Select CO (%) | t (h) | Select CO(%) | t (h) | Select CO(%) | t (h) | Select CO(%) | t (h) | Select CO(%) |
| 0 | 100 | 0 | 98.2 | 0 | 96.6 | 0 | 96.6 | 0 | 96.1 |
| 0.53 | 100 | 0.82 | 99.0 | 0.55 | 98.1 | 0.50 | 96.3 | 0.50 | 97.3 |
| 1.07 | 100 | 1.62 | 99.6 | 1.13 | 98.4 | 1.02 | 96.6 | 1.01 | 97.6 |
| 1.62 | 100 | 2.40 | 99.7 | 1.73 | 98.7 | 1.54 | 96.5 | 1.52 | 98.5 |
| 2.19 | 100 | 3.14 | 99.9 | 2.36 | 98.9 | 2.06 | 97.0 | 2.05 | 98.2 |
| 2.79 | 100 | 3.86 | 100 | 3.02 | 98.9 | 2.61 | 97.1 | 2.59 | 98.3 |
| 3.39 | 100 | 4.57 | 100 | 3.69 | 99.3 | 3.17 | 97.1 | 3.14 | 98.2 |
| 4.03 | 100 | 5.25 | 100 | 4.40 | 99.3 | 4.33 | 97.0 | 4.25 | 98.4 |
| 4.72 | 100 | 5.90 | 100 | 5.15 | 99.2 | 4.92 | 97.2 | 4.83 | 98.3 |
| 5.47 | 100 | | | 5.94 | 99.3 | 6.14 | 97.2 | 6.00 | 98.7 |

Example 10

The materials prepared according to the methodology described in Examples 6 to 8 have been tested as catalysts in the reverse water-gas shift reaction. These catalysts have been chosen to analyse the influence of the type of active phase supported on the cerium-lanthanide mixed oxide. The process has been conducted under the following reaction According to the results obtained (Table 3), the conversion of $CO_2$ and CO selectivity vary according to the type of active phase. Thus, those based on nickel $((Ni)_{0.01}(Ce_{0.9}Gd_{0.1}O_{1.95})_{0.99}))$ and Pt $((Pt)_{0.01}(Ce_{0.9}Gd_{0.1}O_{1.95})_{0.99}))$ produced higher $CO_2$ conversion than that based on copper $((Cu)_{0.01}(Ce_{0.9}Gd_{0.1}O_{1.95})_{0.99}))$. However, that which is based on platinum is somewhat less carbon monoxide-selective, with a small proportion of methane being formed under these reaction conditions.

TABLE 3

It shows the conversion percentage of the $CO_2$ and CO selectivity throughout the reaction time (RWGS reaction) for various catalysts.

| $(Ni)_{0.01}(Ce_{0.9}Gd_{0.1})_{0.99}$ | | | $(Pt)_{0.01}(Ce_{0.9}Gd_{0.1})_{0.99}$ | | | $(Cu)_{0.01}(Ce_{0.9}Gd_{0.1})_{0.99}$ | | |
|---|---|---|---|---|---|---|---|---|
| Time (h) | $CO_2$ Conv (%) | Select to CO (%) | Time (h) | $CO_2$ Conv (%) | Select to CO (%) | Time (h) | $CO_2$ Conv (%) | Select to CO (%) |
| 0.00 | 60.9 | 97.6 | 0.00 | 52.9 | 96.2 | 0.00 | 38.3 | 100.0 |
| 0.87 | 59.0 | 100.0 | 0.54 | 56.0 | 97.4 | 0.47 | 45.7 | 100.0 |
| 1.74 | 54.0 | 100.0 | 1.09 | 55.9 | 97.0 | 0.94 | 46.2 | 100.0 |
| 2.61 | 53.7 | 100.0 | 1.64 | 55.6 | 96.9 | 1.41 | 46.5 | 100.0 |
| 3.41 | 55.7 | 100.0 | 2.23 | 56.0 | 96.9 | 1.88 | 46.4 | 100.0 |
| 4.15 | 55.3 | 100.0 | 2.79 | 56.0 | 96.9 | 2.35 | 46.2 | 100.0 |
| 4.87 | 55.4 | 100.0 | 3.41 | 55.9 | 97.0 | 2.82 | 46.3 | 100.0 |

Example 11

Figure 2:
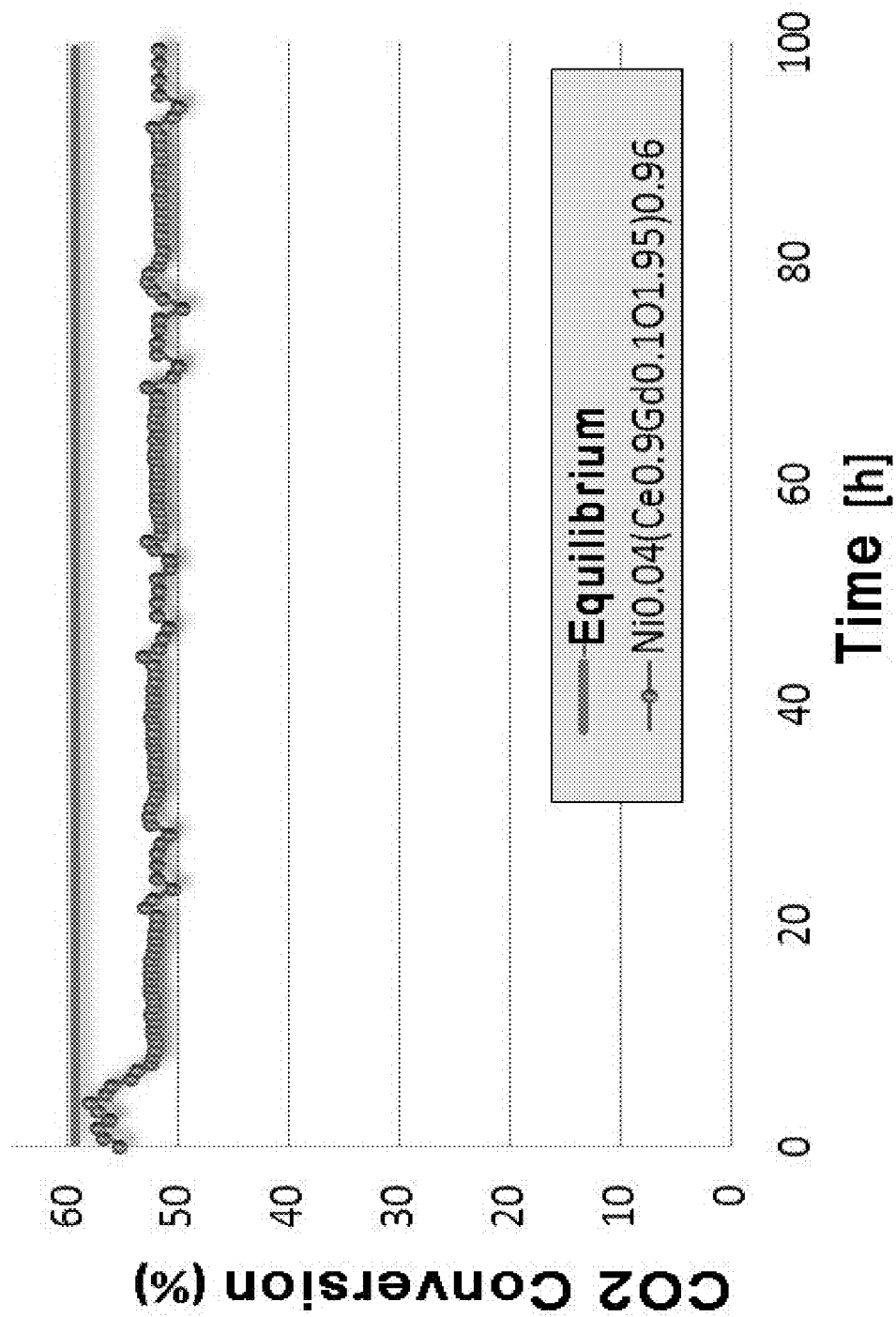

The activity and stability of the catalyst $(Ni)_{0.04}(Ce_{0.9}Gd_{0.1}O_{1.95})_{0.96}$ has been determined by performing a test of durability, during 100 hours of continuous reaction for the of RWGS reaction. The reaction conditions are identical to those used in Example 6. According to the results obtained, the catalyst increases its activity up to a $CO_2$ conversion value very close to thermodynamic equilibrium in the first 4 hours of reaction, and then it experiences a deactivation of less than 6% of conversion in the following 4 hours. From then on, its activity remains virtually stable for 92 hours. See FIG. 2.

Example 12

The materials $(Ni)_{0.02}(Ce_{0.9}Gd_{0.1}O_{1.95})_{0.98}$ and $(Ni)_{0.1}(Ce_{0.9}Gd_{0.1}O_{1.95})_{0.9}$ have been tested as catalysts in the partial oxidation reaction of methane into synthesis gas under the following reaction conditions: 36600 $mL_N/h \cdot g$; 700° C., using a reaction mixture consisting of $N_2$: 40%; $CH_4$: 40% and $O_2$: 20% (molar). Before passing the mixture of reaction gases, the temperature is increased from room temperature up to 700° C., under a nitrogen flow rate of 40 $mL_N$/min and is maintained for 1 hour.

The results of methane conversion and yield to hydrogen based on the reaction time (6 hours) obtained for the catalysts $(Ni)_{0.02}(Ce_{0.9}Gd_{0.1}O_{1.95})_{0.98}$ and $(Ni)_{0.1}(Ce_{0.9}Gd_{0.1}O_{1.95})_{0.9}$ are shown in Table 4. For the catalyst with a Ni:mixed oxide mole fraction equal to 2:98, a deactivation is observed with the reaction time. By contrast, for the catalyst with a Ni:mixed oxide fraction equal to 10:90, greater stability as well as higher $CH_4$ conversion values and hydrogen yield are observed. The values found are very close to the thermodynamic equilibrium for these reaction conditions.

TABLE 4

It shows the $CH_4$ conversion percentage and $H_2$ yield throughout the reaction time (the partial oxidation reaction of methane to synthesis gas) for various catalysts.

| $(Ni)_{0.02}(Ce_{0.9}Gd_{0.1}O_{1.95})_{0.98}$ | | | $(Ni)_{0.1}(Ce_{0.9}Gd_{0.1}O_{1.95})_{0.8}$ | | |
|---|---|---|---|---|---|
| t(h) | $CH_4$ Conv (%) | $H_2$ moles yield/$CH_4$mol fed | t(h) | $CH_4$ Conv (%) | $H_2$ moles yield/$CH_4$ mol fed |
| 1 | 72.7 | 1.093 | 1 | 83.2 | 1.304 |
| 2 | 65.0 | 0.977 | 2 | 82.3 | 1.318 |
| 3 | 62.2 | 0.880 | 3 | 81.7 | 1.303 |
| 4 | 59.6 | 0.897 | 4 | 81.4 | 1.295 |
| 5 | 57.9 | 0.840 | 5 | 81.1 | 1.287 |
| 6 | 56.6 | 0.829 | 6 | 81.0 | 1.295 |

Example 13

The textural properties of the catalysts $Ni_{0.1}(Ce_{0.9}Gd_{0.1}O_{1.95})_{0.9}$, $Ni_{0.1}(Ce_{0.9}La_{0.1}O_{1.95})_{0.9}$, $Ni_{0.1}(Ce_{0.9}Nd_{0.1}O_{1.95})_{0.9}$, $Ni_{0.1}(Ce_{0.9}Sm_{0.1}O_{1.95})_{0.9}$ have been determined by Hg porosimetry.

The protocol for determining the porosity, surface area, and average pore size by mercury porosimetry was as follows: The sample was degassed at 80 degrees Celsius for 3 hours. A sample amount of between 20 to 40 mg was introduced into a sample holder of a mercury porosimeter (Autopore IV mercury Porosimeter, Micromeritics). Then the mercury intrusion porosimetry, which is a technique of adsorption using mercury as the adsorbate, was performed.

Through the application of pressure, mercury is forced to enter the pores of the solid. The value of the volume of mercury intruded allows calculating the area, distribution by pore size and porosity percentage of the material. This technique is used when the material under study has (2-50 nm) mesopores and (>50 nm) macropores. Analysis conditions used were: surface tension: 484 din/cm); contact angle: 141 degrees; Maximum pressure: 60000 psi.

Figure 3:
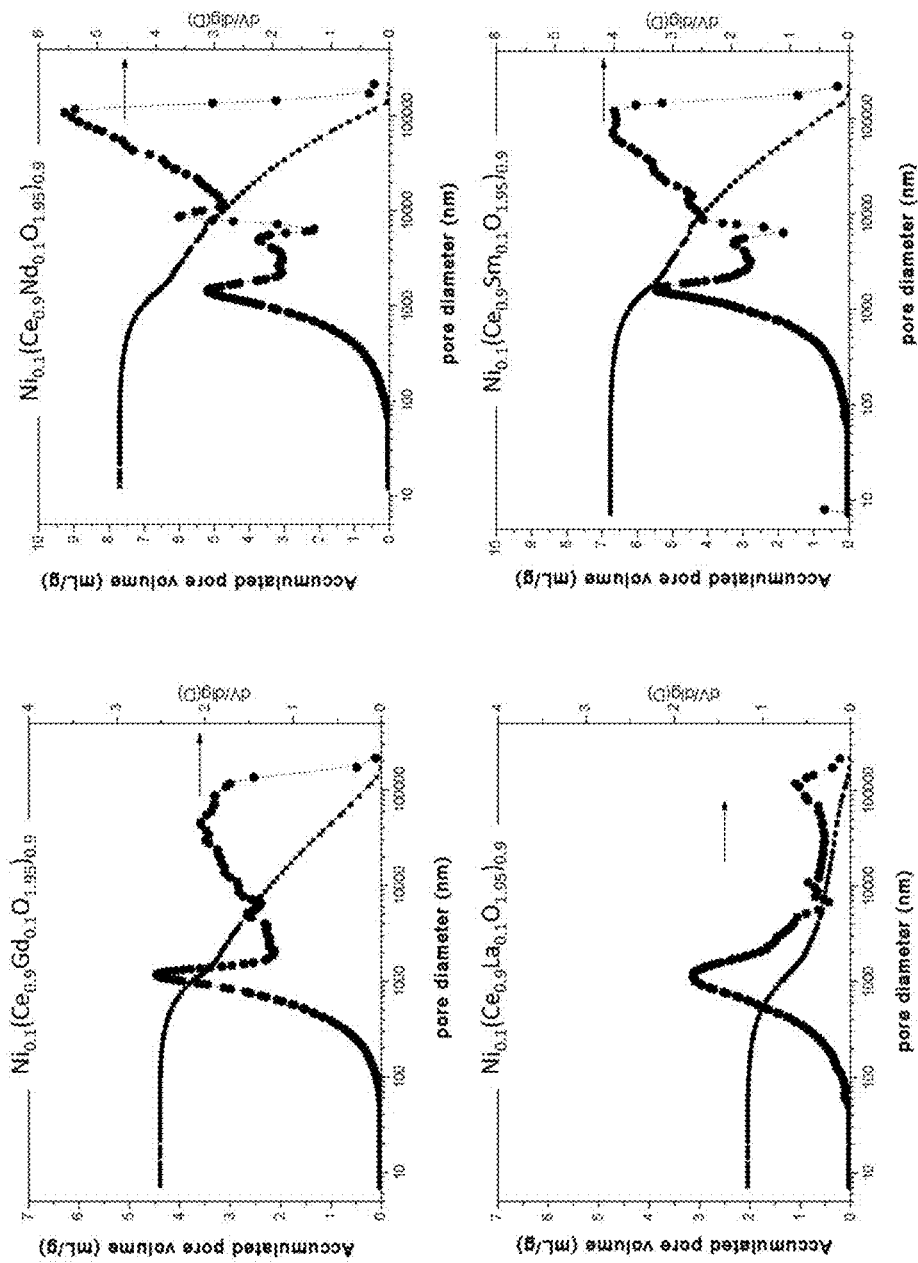
FIG. 3. Pore size distribution of the compounds of formula $Ni_{0.1}(Ce_{0.9}Gd_{0.1}O_{1.95})_{0.9}$, $Ni_{0.1}(Ce_{0.9}La_{0.1}O_{1.95})_{0.9}$, $Ni_{0.1}(Ce_{0.9}Nd_{0.1}O_{1.95})_{0.9}$ and $Ni_{0.1}(Ce_{0.9}Sm_{0.1}O_{1.96})_{0.9}$.

FIG. 3 shows the pore size distribution of the compounds of formula $Ni_{0.1}(Ce_{0.9}Gd_{0.1}O_{1.95})_{0.9}$, $Ni_{0.1}(Ce_{0.9}La_{0.1}O_{1.95})_{0.9}$, $Ni_{0.1}(Ce_{0.9}Nd_{0.1}O_{1.95})_{0.9}$ and $Ni_{0.1}(Ce_{0.9}Sm_{0.1}O_{1.95})_{0.9}$. The results are summarised in Table 5 below.

TABLE 5

It shows the total pore area in $m^2/g$, the porosity percentage and average pore diameter in µm for each of the following catalysts $Ni_{0.1}(Ce_{0.9}Gd_{0.1}O_{1.95})_{0.9}$, $Ni_{0.1}(Ce_{0.9}La_{0.1}O_{1.95})_{0.9}$, $Ni_{0.1}(Ce_{0.9}Nd_{0.1}O_{1.95})_{0.9}$, $Ni_{0.1}(Ce_{0.9}SM_{0.1}OR_{1.95})_{0.9}$.

| Catalyst | Total pore area ($m^2$g) | Porosity (%) | Average pore diameter (µm) |
|---|---|---|---|
| $Ni_{0.1}(Ce_{0.9}Gd_{0.1}O_{1.95})_{0.9}$ | 8.6 | 92.4 | 2.03 |
| $Ni_{0.1}(Ce_{0.9}La_{0.1}O_{1.95})_{0.9}$ | 8.9 | 84.1 | 0.91 |
| $Ni_{0.1}(Ce_{0.9}Nd_{0.1}O_{1.95})_{0.9}$ | 10.4 | 95.3 | 2.96 |
| $Ni_{0.1}(Ce_{0.9}Sm_{0.1}O_{1.95})_{0.9}$ | 9.4 | 94.3 | 2.87 |

The invention claimed is:

1. A process for the obtainment of a cerium oxide partially substituted with a lanthanide in the positions of the Ce, and nanoparticles of a precious or semi-precious metal selected from the groups 8, 9, 10 and 11 of the periodic table of the elements deposited in metallic form on the surface of the cerium oxide, which is a compound of formula:

$$M_y(Ce_{1-x}L_xO_{2-x/2})_{1-y}$$

wherein M is a metal selected from Ni, Ru, Rh, Pd, Ir, Pt, Ag, Au and Cu, which is in metallic state;

wherein x is different to 0, and less than or equal to 0.4 and y=0.001-0.6, and wherein L is a lanthanide selected from La, Pr, Nd, Sm, Eu, Gd, Tb, Dy, Ho, Er, Tm, Yb and Lu, characterised in that it comprises the following steps:

a) adding in the minimum essential amount of water, stoichiometric amounts of

Cerium nitrate,

Water soluble salt of a metal selected from the group consisting of Ni, Ru, Rh, Pd, Ir, Pt, Ag, Au and Cu, and a nitrate of a lanthanide selected from the group consisting of La, Pr, Nd, Sm, Eu, Gd, Tb, Dy, Ho, Er, Tm, Yb and Lu, and adding to the previous solution a fuel in a molar ratio of between 0.7 and 1.0 with respect to the total amount of nitrates,
and stirring at room temperature till complete dissolution, and
b) heating the solution obtained in step (a) at a temperature between 200° C. and 600° C. in a controlled atmosphere, thereby preventing water present in the solution from evaporating completely.

2. The process according to claim 1, wherein the water soluble salt used in step (a) is $Ni(NO_3)_2 \cdot 6H_2O$ and the metal is Ni.

3. The process according to claim 1, wherein the water soluble salt used in step (a) is $Cu(NO_3)_2 \cdot 6H_2O$ and the metal is Cu.

4. The process according to claim 1, wherein the Pt water soluble salt used in step (a) is a salt selected from Tetraammineplatinum (II) Hydroxide Hydrate $((NH_3)_4Pt(OH)_2 \cdot xH_2O)$ and Tetraammineplatinum(II) nitrate $(Pt(NH_3)4(NO_3)_2)$.

5. The process according to claim 1, characterized in that the lanthanide is Gd.

6. The process according to claim 1, characterized in that x has a value between 0.05 and 0.2; and
y has a value between 0.001 and 0.15.

7. The process according to claim 1, characterized in that the lanthanide is La.

8. The process according to claim 7, characterized in that x has a value between 0.05 and 0.2; and
y has a value between 0.001 and 0.15.

9. The process according to claim 1, characterized in that the lanthanide is Sm.

10. The process according to claim 9, characterized in that x has a value between 0.05 and 0.2 and
y has a value between 0.001 and 0.15.

11. The process according to claim 1, wherein the fuel use in step (a) is selected from glycine, urea, citric acid and a combination thereof.

12. The process according to claim 11, wherein the fuel use in step (a) is glycine.

13. The process according to claim 1, characterised in that step (c) is performed at a temperature between 200° C. and 500° C.

14. A compound of a cerium oxide partially substituted with a lanthanide in the positions of the Ce, and nanoparticles selected from Pt and Cu in metallic form deposited on the surface of the cerium oxide, which is a compound of formula:

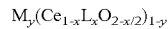

wherein M is a metal selected from Pt and Cu, which is in metallic state, and wherein the formula is $Cu_y(Ce_{1-x}L_xO_{2-x/2})_{1-y}$ and $Pt_y(Ce_{1-x}L_xO_{2-x/2})_{1-y}$ respectively;
wherein x is different to 0, and less than or equal to 0.4 and y=0.005-0.6, if M is Cu; and wherein x is different to 0, and less than or equal to 0.4 and y=0.001-0.6, if M is Pt;
L is a lanthanide selected from La, Pr, Nd, Sm, Eu, Gd, Tb, Dy, Ho, Er, Tm, Yb and Lu, and
wherein the compound presents a porosity percent between 70% and 95% and a pore mean diameter between 0.5 μm and 5 μm.

15. The compound according to claim 14, wherein the lanthanide is Gd.

16. The compound according to claim 15, characterized in that
x has a value of between 0.05 and 0.2; and
y has a value of between 0.001 and 0.15.

17. The compound according to claim 14, wherein the lanthanide is La.

18. The compound according to claim 17, characterized in that
x has a value of between 0.05 and 0.2; and
y has a value of between 0.001 and 0.15.

19. The compound according to claim 14, wherein the lanthanide is Sm.

20. The compound according to claim 19, characterized in that
x has a value of between 0.05 and 0.2; and
y has a value of between 0.001 and 0.15.

21. The compound according to claim 14, characterized in that the compound is selected from $Ni_{0.1}(Ce_{0.96}Gd_{0.04}O_{1.95})_{0.9}$, $Ni_{0.1}(Ce_{0.9}Gd_{0.1}O_{1.95})_{0.9}$, $Ni_{0.1}(Ce_{0.9}La_{0.1}O_{1.95})_{0.9}$, and $Ni_{0.1}(Ce_{0.9}Gd_{0.1}O_{1.95})_{0.9}$.

* * * * *